(12) United States Patent
Lee et al.

(10) Patent No.: US 10,889,182 B1
(45) Date of Patent: Jan. 12, 2021

(54) PORTAL BOX ASSEMBLIES AND WET BRAKE SYSTEMS FOR VEHICLES

(71) Applicants: Cory Lee, Shreveport, LA (US); Jesse L. Johnson, Keithville, LA (US)

(72) Inventors: Cory Lee, Shreveport, LA (US); Jesse L. Johnson, Keithville, LA (US)

(73) Assignee: High Lifter Products, Inc., Shreveport, LA (US)

( * ) Notice: Subject to any disclaimer, the term of this patent is extended or adjusted under 35 U.S.C. 154(b) by 137 days.

(21) Appl. No.: 16/408,076

(22) Filed: May 9, 2019

(51) Int. Cl.
| | |
|---|---|
| *B60K 17/04* | (2006.01) |
| *F16D 55/41* | (2006.01) |
| *F16H 1/20* | (2006.01) |
| *B60T 1/06* | (2006.01) |
| *B60G 17/00* | (2006.01) |
| *F16D 127/02* | (2012.01) |
| *F16D 125/32* | (2012.01) |
| *B60G 3/18* | (2006.01) |
| *F16D 121/14* | (2012.01) |
| *F16D 121/04* | (2012.01) |

(52) U.S. Cl.
CPC ............ *B60K 17/043* (2013.01); *B60G 17/00* (2013.01); *B60T 1/065* (2013.01); *F16D 55/41* (2013.01); *F16H 1/20* (2013.01); *B60G 3/18* (2013.01); *B60G 2300/07* (2013.01); *F16D 2121/04* (2013.01); *F16D 2121/14* (2013.01); *F16D 2125/32* (2013.01); *F16D 2127/02* (2013.01)

(58) Field of Classification Search
CPC ...... B60T 1/065; F16D 55/41; F16D 2121/04; F16D 2125/32; F16H 1/20
See application file for complete search history.

(56) References Cited

U.S. PATENT DOCUMENTS

| | | | |
|---|---|---|---|
| 4,344,501 A | 8/1982 | Jerry et al. | |
| 10,479,156 B2* | 11/2019 | Eaton | B60K 17/043 |
| 10,527,130 B2* | 1/2020 | Shirley | F16H 57/031 |
| 2006/0207384 A1 | 9/2006 | Hardy et al. | |
| 2012/0181850 A1 | 7/2012 | Armfield | |
| 2014/0230602 A1 | 8/2014 | Shirley | |
| 2015/0101876 A1 | 4/2015 | Shirley | |
| 2020/0198396 A1* | 6/2020 | Stephan | B60B 35/163 |
| 2020/0231037 A1* | 7/2020 | Stephan | B60K 17/043 |

* cited by examiner

*Primary Examiner* — Faye M Fleming
(74) *Attorney, Agent, or Firm* — R. Keith Harrison

(57) ABSTRACT

A portal box assembly for mounting a wheel of a vehicle having a drive axle may include a portal box housing configured for mounting on the vehicle. The portal box housing may have a housing interior. A lift kit and gear reduction system may be provided in the housing interior of the portal box housing. The lift kit and gear reduction system may include an input gear configured to be drivingly engaged by the drive axle on the vehicle. At least one idler gear may be drivingly engaged by the input gear. An output gear may be drivingly engaged by the input gear through the idler gear(s). The output gear may be disposed in offset or spaced-apart relationship to the input gear. A spindle may be drivingly engaged by the output gear. The spindle may be configured to drivingly engage the wheel of the vehicle. A wet brake system may be provided in the housing interior of the portal box housing. The wet brake system may be deployable between a brake release configuration and a braking configuration applying a braking force to the spindle. Wet brake systems for mounting a wheel of a vehicle having a drive axle are also disclosed.

21 Claims, 10 Drawing Sheets

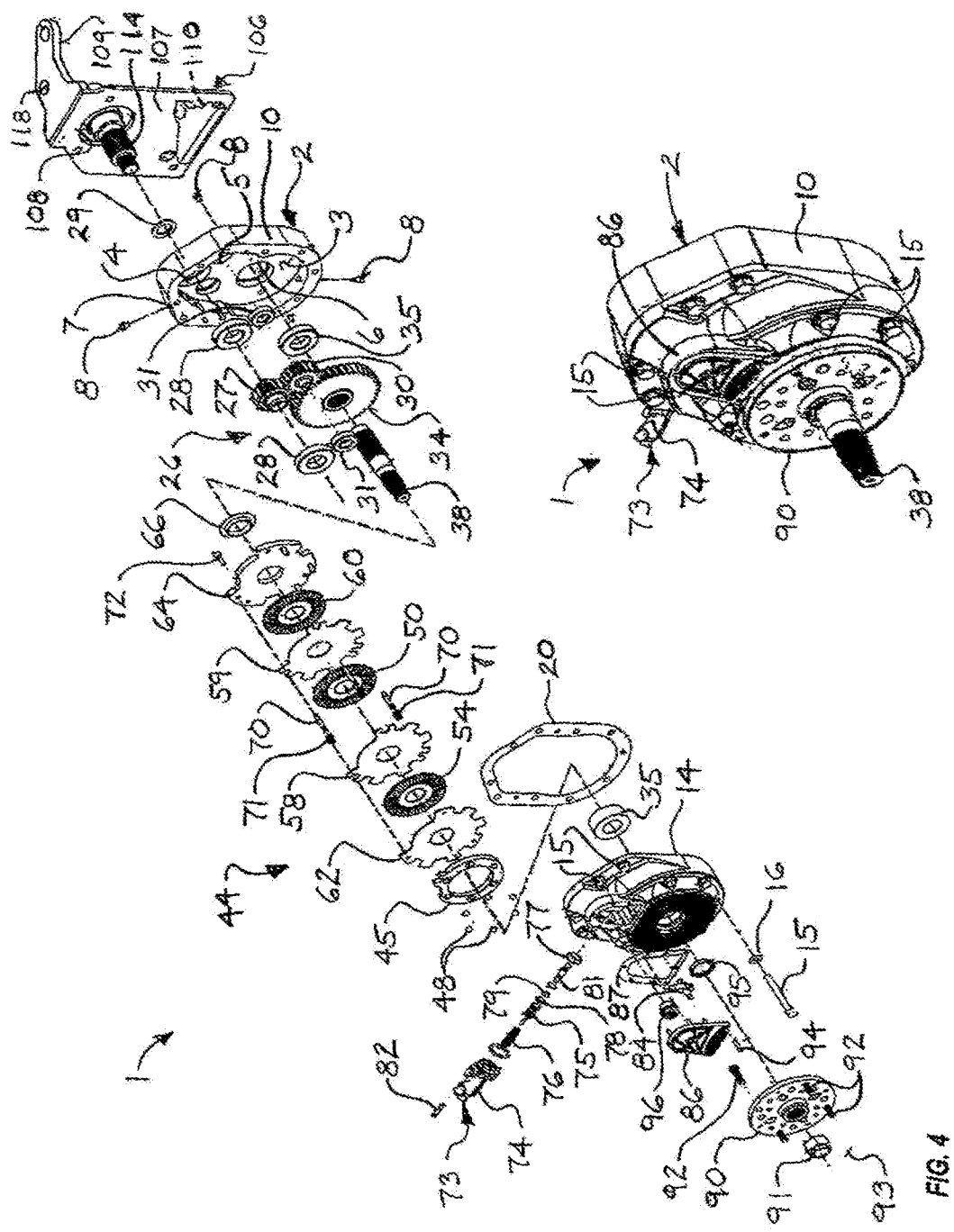

10,889,182 B1

PORTAL BOX ASSEMBLIES AND WET BRAKE SYSTEMS FOR VEHICLES

FIELD

The disclosure generally relates to vehicles such as all-terrain vehicles (ATVs), side-by-side or utility task vehicles (UTVs) and the like. More particularly, illustrative embodiments of the disclosure relate to portal box assemblies having a portal box housing which contains both a lift kit and gear reduction system and a wet brake system for each wheel of a vehicle, and wet brake systems for vehicles.

SUMMARY

Illustrative embodiments of the disclosure are generally directed to portal box assemblies for mounting a wheel of a vehicle having a drive axle. An illustrative embodiment of the portal box assembly may include a portal box housing configured for mounting on the vehicle. The portal box housing may have a housing interior. A lift kit and gear reduction system may be provided in the housing interior of the portal box housing. The lift kit and gear reduction system may include an input gear configured to be drivingly engaged by the drive axle on the vehicle. At least one idler gear may be drivingly engaged by the input gear. An output gear may be drivingly engaged by the input gear through the idler gear(s). The output gear may be disposed in offset or spaced-apart relationship to the input gear. A spindle may be drivingly engaged by the output gear. The spindle may be configured to drivingly engage the wheel of the vehicle. A wet brake system may be provided in the housing interior of the portal box housing. The wet brake system may be deployable between a brake release configuration and a braking configuration applying a braking force to the spindle.

Illustrative embodiments of the disclosure are further generally directed to wet brake systems for mounting a wheel of a vehicle having a drive axle. An illustrative embodiment of the wet brake systems may include a brake housing configured for mounting on the vehicle. A wet brake system may be in the brake housing. The wet brake system may be deployable between a brake release configuration and a braking configuration and configured to apply a braking force to the drive axle. The wet brake system may include a piston slidably disposed in the brake housing between a brake release position and a braking position. A pressure plate may be carried by the brake housing in fixed and spaced-apart relationship to the piston. At least one clamp plate may be disposed for axial movement between the piston and the pressure plate. At least one friction disk may be configured to be splined to the drive axle between the at least one clamp plate and the pressure plate.

BRIEF DESCRIPTION OF THE DRAWINGS

Illustrative embodiments of the disclosure will now be described, byway of example, with reference to the accompanying drawings, in which:

FIG. 4 is an exploded front perspective view of an illustrative embodiment of the portal box assembly;

FIG. 5 is a front perspective view of the assembled portal box assembly;

DETAILED DESCRIPTION

Figure 1:
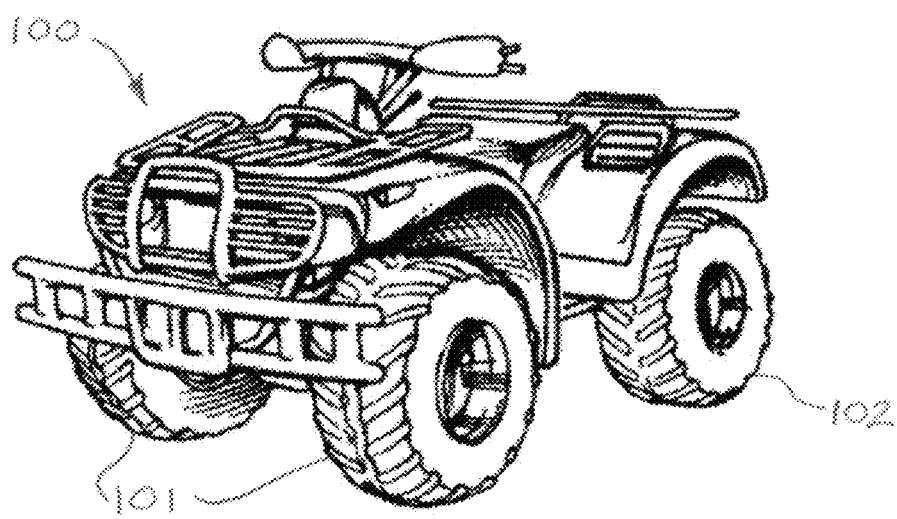
FIG. 1 is front perspective view of a typical all-terrain vehicle (ATV) fitted with portal box assemblies (not illustrated) according to illustrative embodiments of the disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper" "lower", "left", "rear", "right" "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-6 of the drawings, an illustrative embodiment of the portal box assembly is generally indicated by reference numeral 1 in FIGS. 2-5. The portal box assembly 1 may include a portal box housing 2. A lift kit and gear reduction system 26 (FIG. 6) and a wet brake system 44 may be contained in the portal box housing 2. In typical application, which will be hereinafter described, a portal box assembly 1 may be installed at each of the front wheels 101 and each of the rear wheels 102 of a vehicle such as an all-terrain vehicle (ATV) or side-by-side or utility task vehicle (UTV), hereinafter vehicle 100, illustrated in FIG. 1. The lift kit and gear reduction system 26 of the portal box assembly 1 may lift the chassis relative to the front wheels 101 and the rear wheels 102 and increase the wheel torque of the vehicle 100, whereas the wet brake system 44 of the portal box assembly 1 may facilitate independent braking at each of the front wheels 101 and the rear wheels 102 of the vehicle 100.

Figure 2:
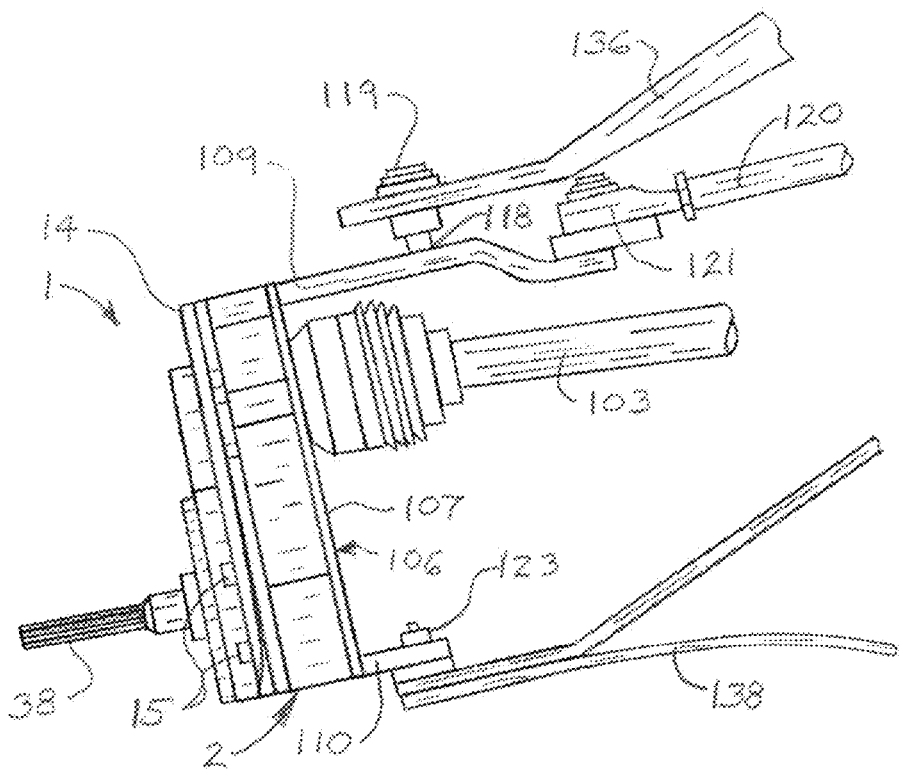
FIG. 2 is aside view of a typical left front drive axle with upper and lower suspension arms of the ATV illustrated in FIG. 1, with an illustrative embodiment of the portal box assembly mounted on the suspension arms.
Figure 7:
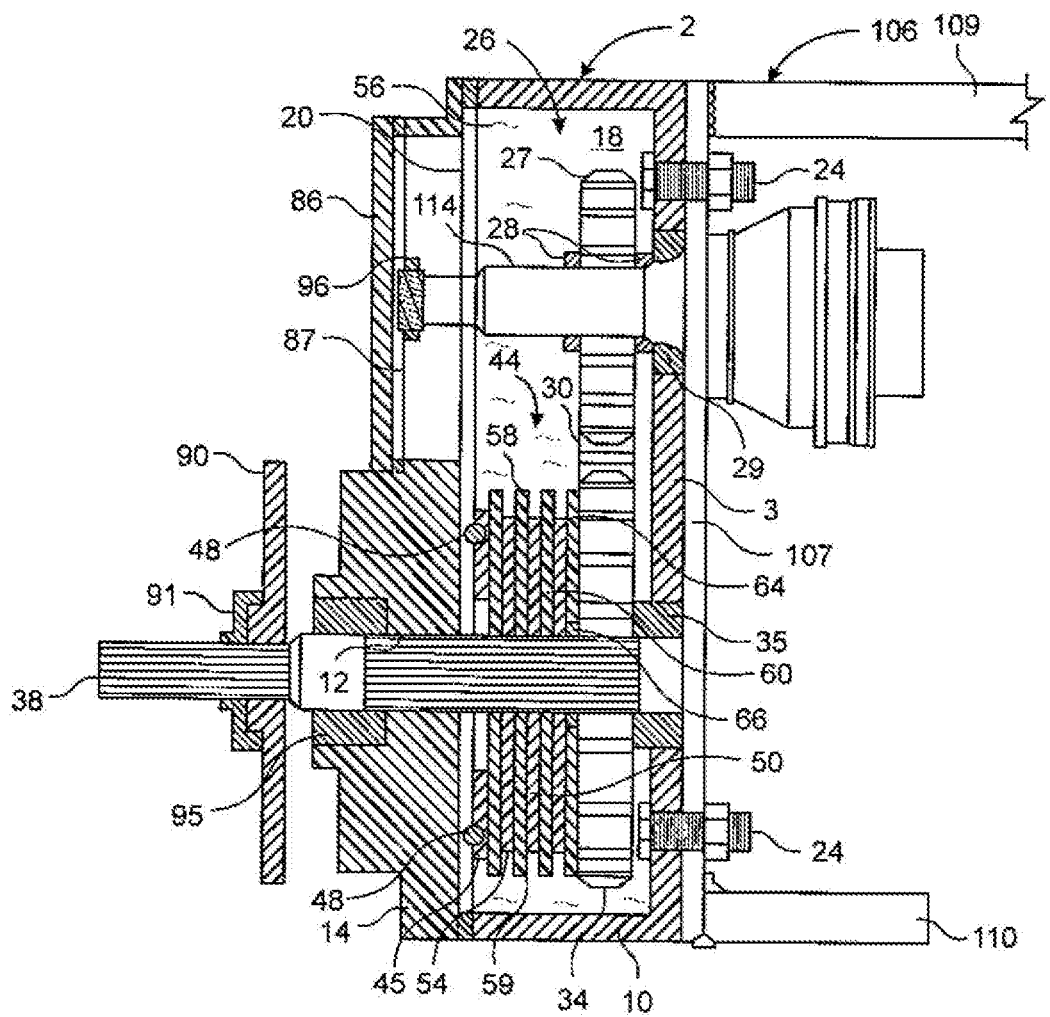
FIG. 7 is a sectional view of an illustrative embodiment of the portal box assembly, mounted on a typical portal box mount bracket on the ATV (not illustrated)

FIG. 2 illustrates a typical manner of mounting the portal box assembly 1 at a left front drive axle 103 for each front wheel 101 (FIG. 1) of the vehicle 100. The vehicle 100 may include a front upper suspension arm 136 and a front lower suspension arm 138 for each front wheel 101. In some applications, a portal box mount bracket 106 may be used to mount the portal box housing 2 of the portal box assembly 1 on the upper suspension arm 136 and the lower suspension arm 138. The portal box mount bracket 106 may have any design which is suitable for the purpose. In some embodiments, the portal box mount bracket 106 may include a housing mount plate 107. As illustrated in FIG. 7, the portal box housing 2 may be mounted on the housing mount plate 107 such as by using suitable housing mount bolts 24. A housing shaft opening 108 (FIG. 4) may extend through the housing mount plate 107. A CV shaft 114 may extend from the corresponding left front drive axle 103 (FIG. 2) or right front drive axle (not illustrated) through the housing shaft opening 108. An upper bracket arm 109 and a lower bracket flange 110 may extend from the housing mount plate 107. As illustrated in FIG. 2, the front upper suspension arm 136 may attach to the bracket arm 109 via an upper ball joint 119 which may insert through an upper ball joint opening 118 in the bracket arm 109. A steering rod 120 may attach to the bracket arm 109 via a steering rod joint 121. The front lower suspension arm 138 may attach to the bracket flange 110 of the portal box mount bracket 106 via a lower ball joint stud 123.

Figure 3:
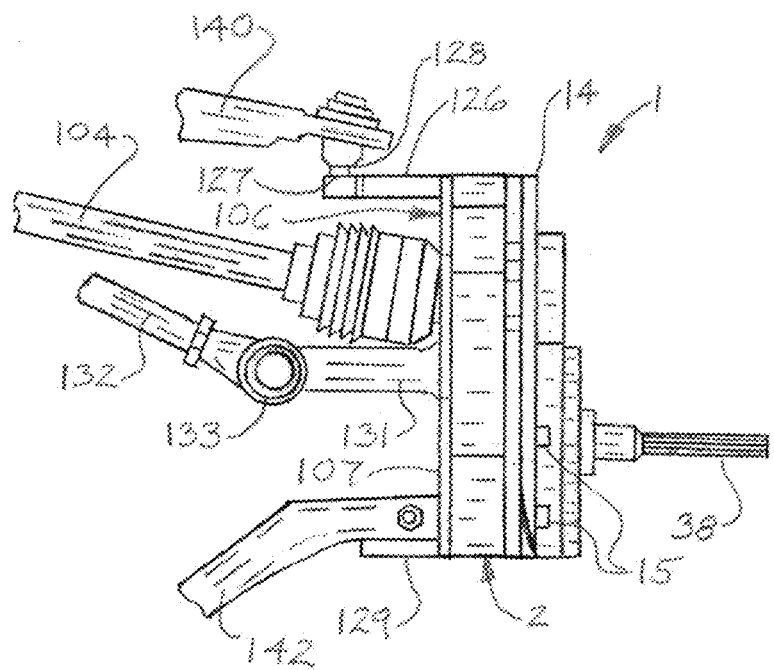
FIG. 3 is a side view of a typical right rear drive axle with upper and lower suspension arms of the ATV illustrated in FIG. 1, with an illustrative embodiment of the portal box assembly mounted on the suspension arms.

FIG. 3 illustrates a typical manner of mounting the portal box assembly 1 at a left rear drive axle 104 for each rear wheel 102 (FIG. 1) of the vehicle 100. The vehicle 100 may include a rear upper suspension arm 140 and a rear lower suspension arm 142 for each rear wheel 102. The portal box mount bracket 106 may include an upper bracket arm 126 and a lower bracket flange 129 which extend from the housing mount plate 107. The rear upper suspension arm 140 may attach to the upper bracket arm 126 of the portal box mount bracket 106 via an upper ball joint stud 128 which may insert through a stud opening 127 in the bracket arm 126. The rear lower suspension arm 142 may attach to the bracket flange 129 of the portal box mount bracket 106 via a suitable fastener or other mechanism (not illustrated). The CV shaft 114 (FIG. 4) may extend from the left rear drive axle 104 or right rear drive axle (not illustrated) through the shaft opening 108 in the housing mount plate 107. A radius bar bracket 131 may extend from the housing mount plate 107. A radius bar 132 may be pivotally attached to the radius bar bracket 131 via a radius bar joint 133. Alternatively, in some vehicles 100, the radius bar 132, rear upper suspension arm 140 and rear lower suspension arm 142 and/or other structural components of the vehicle 100 may connect to the portal box mount bracket 106 via collars and bushings as is known by those skilled in the art.

It will be recognized and understood that the portal box mount bracket 106 which is heretofore described with respect to FIGS. 2-4 represents a non-limiting example of a support structure which is suitable for mounting the portal box housing 2 at each front wheel 101 and each rear wheel 102 of the vehicle 100. Alternative support structures or techniques known by those skilled in the art may be used for the purpose.

Referring next to FIGS. 4-9 of the drawings, the portal box housing 2 of the portal box assembly 1 may have a rear housing wall 3. A side housing wall 10 may extend from the rear housing wall 3. A housing cover 14 may be provided on the side housing wall 10. A housing interior 18 (FIG. 7) may be formed by and between the rear housing wall 3, the side housing wall 10 and the housing cover 14.

In some embodiments, the housing cover 14 may be detachably attached to the side housing wall 10 according to the knowledge of those skilled in the art. Accordingly, in some embodiments, cover fasteners 15 with flat washers 16 (FIG. 4) may be used for the purpose. A housing gasket 20 may be sandwiched between the side housing wall 10 and the housing cover 14 for fluid sealing purposes.

As further illustrated in FIG. 4, in some embodiments, at least one fluid opening 7 may extend through the rear housing wall 3 and/or the side housing wall 10 of the portal box housing 2. The fluid openings 7 may facilitate placement of brake cooling fluid 56 (FIG. 7) in the housing interior 18 for purposes of cooling the wet brake system 44, as will be hereinafter further described. A removable plug 8 may sealingly engage each fluid opening 7.

An output shaft opening 4 may extend through the rear housing wall 3. The CV shaft 114 may extend through an input seal 29 seated in the output shaft opening 4. An output gear opening 6 may extend through the rear housing wall 3 in spaced-apart or vertically offset relationship with respect to and generally beneath the output shaft opening 4.

The lift kit and gear reduction system 26 may include an input gear 27 which is drivingly engaged by the CV shaft 114. The input gear 27 may be journaled for rotation on a pair of input gear bearings 28 in the housing interior 18 of the portal box housing 2. An output gear 34 which is vertically offset from the input gear 27 may be drivingly engaged for rotation by the input gear 27. The output gear 34 may be journaled for rotation on an output gear bearing 35 in the housing interior 18.

In some embodiments, an idler gear opening 5 may extend through the rear housing wall 3 generally between the output shaft opening 4 and the output gear opening 6. An idler gear 30 may be drivingly engaged by the input gear 27 and drivingly engage the output gear 34. The idler gear 30 may be journaled for rotation on an idler gear bearing 31 in the housing interior 18. Accordingly, the idler gear 30 may transmit rotation from the input gear 27 to the output gear 34.

A splined spindle 38 may be drivingly engaged for rotation by the output gear 34. The spindle 38 may extend through the output gear bearing 35 in the housing interior 18. The spindle 38 may be suitably configured to drivingly engage the corresponding front wheel 101 or rear wheel 102 of the vehicle 100, typically as will be hereinafter described. Accordingly, responsive to rotation of the CV shaft 114, the input gear 27 rotates the output gear 34 typically through the idler gear 30 in the housing interior 18. The output gear 34 rotates the spindle 38, which rotates the corresponding front wheel 101 or rear wheel 102.

Due to the vertically-spaced or offset relationship between the CV shaft 114 and the output gear 34, the lift kit and gear reduction system 26 imparts vertical lift of the chassis relative to the front wheels 101 and rear wheels 102 of the vehicle 100. Additionally, the gear ratio of the output gear 34 and the input gear 27 may be selected to increase the wheel torque of the vehicle 100.

The wet brake system 44 may include any type of braking device which is deployable between a braking configuration in which the device applies a braking force to the spindle 38 and a brake release configuration in which the device releases the braking force from the spindle 38 responsive to actuation by an operator of the vehicle 100. As illustrated in FIGS. 4 and 6-9, in some embodiments, the wet brake system 44 may include a wet brake type braking system. Accordingly, the wet brake system 44 may include a cam plate 45 which may be positioned over and rotatable between a brake release position and a braking position with respect to the spindle 38. The cam plate 45 may be disposed for axial movement with respect to the spindle 38 responsive to partial rotation of the cam plate 45, typically in a manner which will be hereinafter described. A pressure plate 64, typically having a built-in thrust bearing 66 (FIG. 4), may be immovably mounted in the portal box housing 2 in fixed relationship with respect to the spindle 38 in spaced-apart relationship to the cam plate 45. An outer clamp plate 62 may be provided on the spindle 38 adjacent to the cam plate 45. A first inner clamp plate 58 and a second inner clamp plate 59 may be provided on the spindle 38 between the outer clamp plate 62 and the pressure plate 64. The first inner clamp plate 58, the second inner clamp plate 59 and the outer clamp plate 62 may each be disposed for axial movement with respect to the spindle 38.

A first outer friction disk 54 may be splined to the spindle 38 between the outer clamp plate 62 and the first inner clamp plate 58. A second outer friction disk 60 may be splined to the spindle 38 between the pressure plate 64 and the second inner clamp plate 59. An inner friction disk 50 may be splined to the spindle 38 between the first inner clamp plate 58 and the second inner clamp plate 59. Accordingly, the first outer friction disk 54, the second outer friction disk 60 and the inner friction disk 50 may rotate with the spindle 38.

Figure 6:
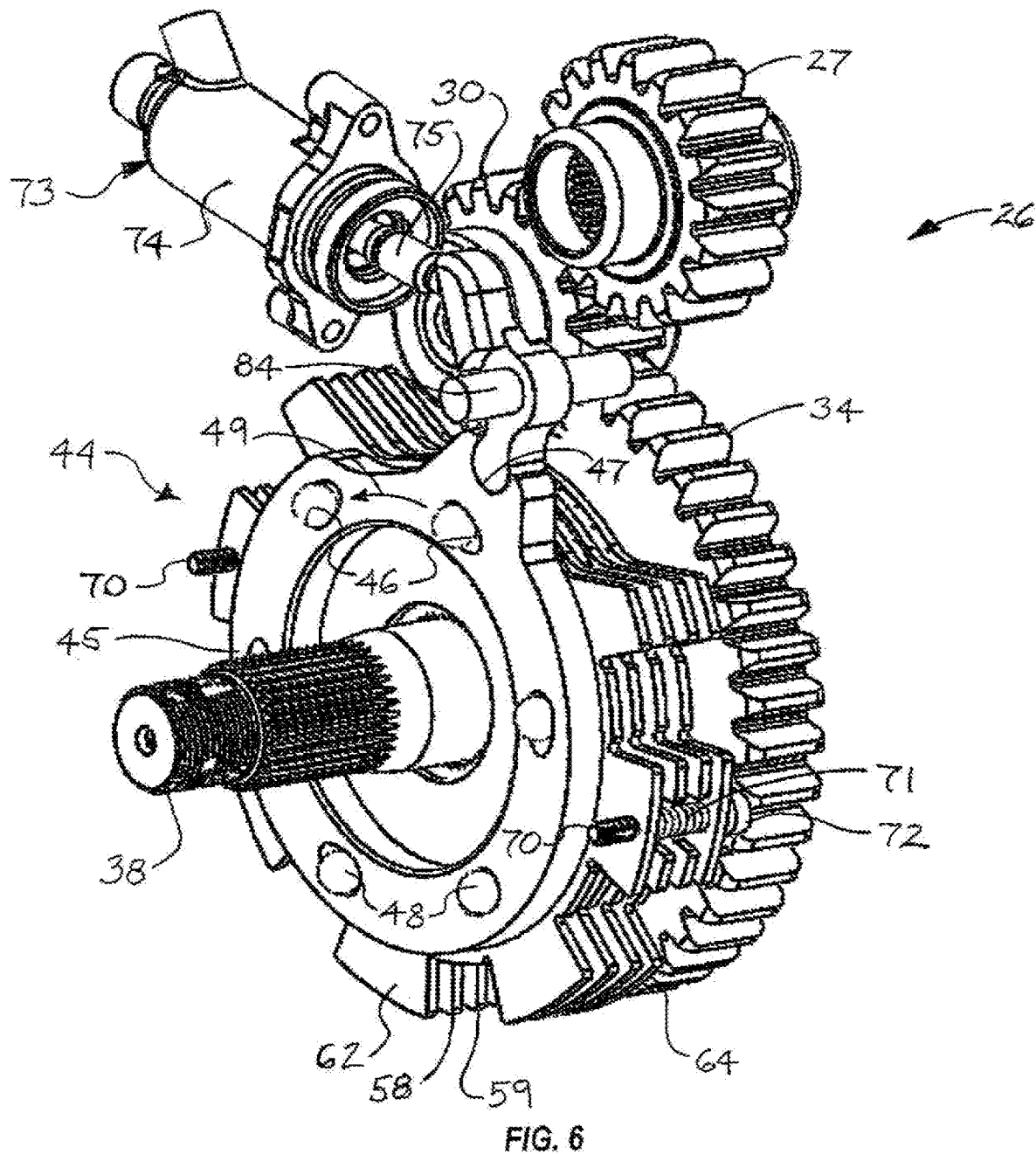
FIG. 6 a perspective view of a typical lift kit and gear reduction system and a typical wet brake system of an illustrative embodiment of the portal box assembly.
Figure 8:
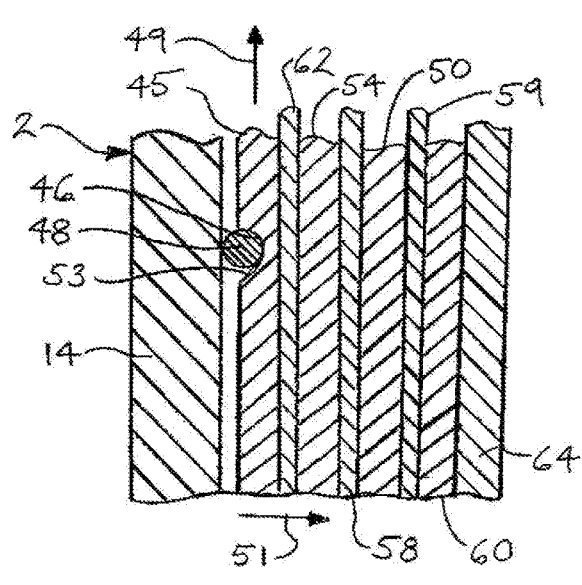
FIG. 8 is an enlarged sectional view of a portion of a housing cover of the portal box housing and the wet brake system disposed in a disengaged, release configuration.
Figure 9:
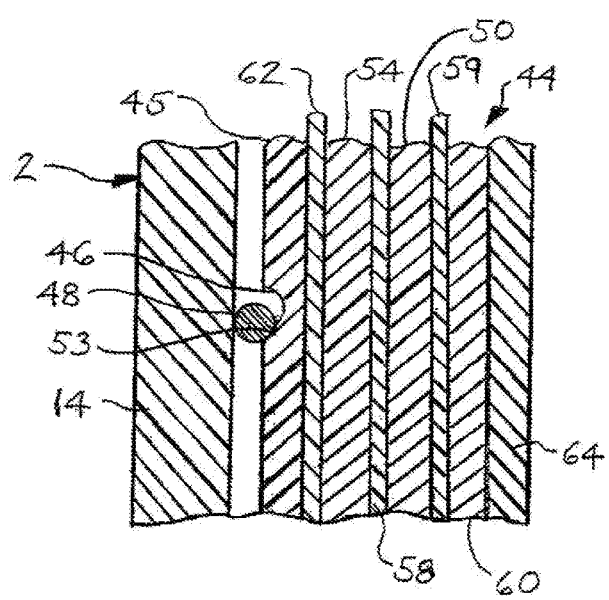
FIG. 9 is a sectional view of the housing cover and the wet brake system disposed in an engaged, braking configuration to apply braking action to a wheel of the ATV.
Figure 10:
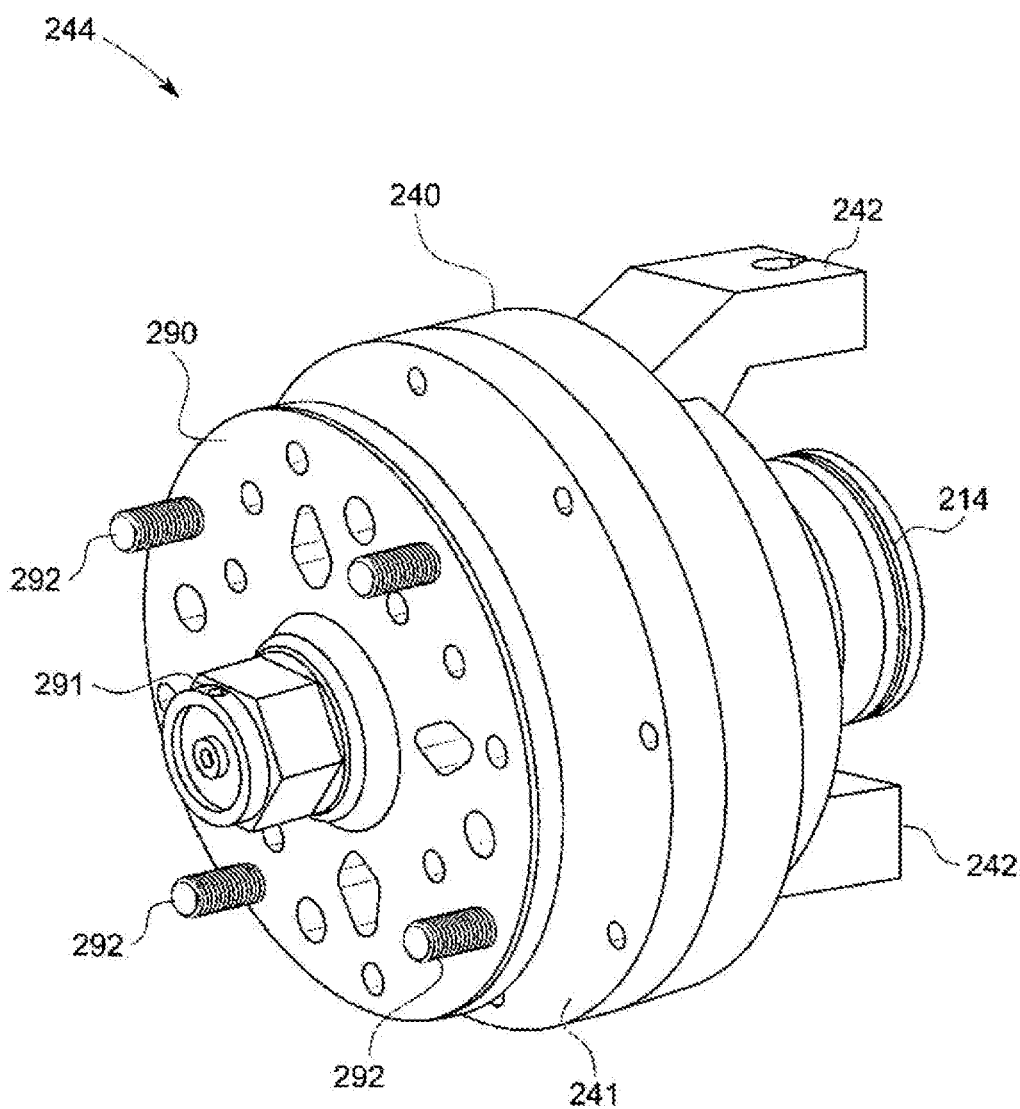
FIG. 10 is a front perspective view of an illustrative wet brake system suitable for application on a vehicle.
Figure 11:
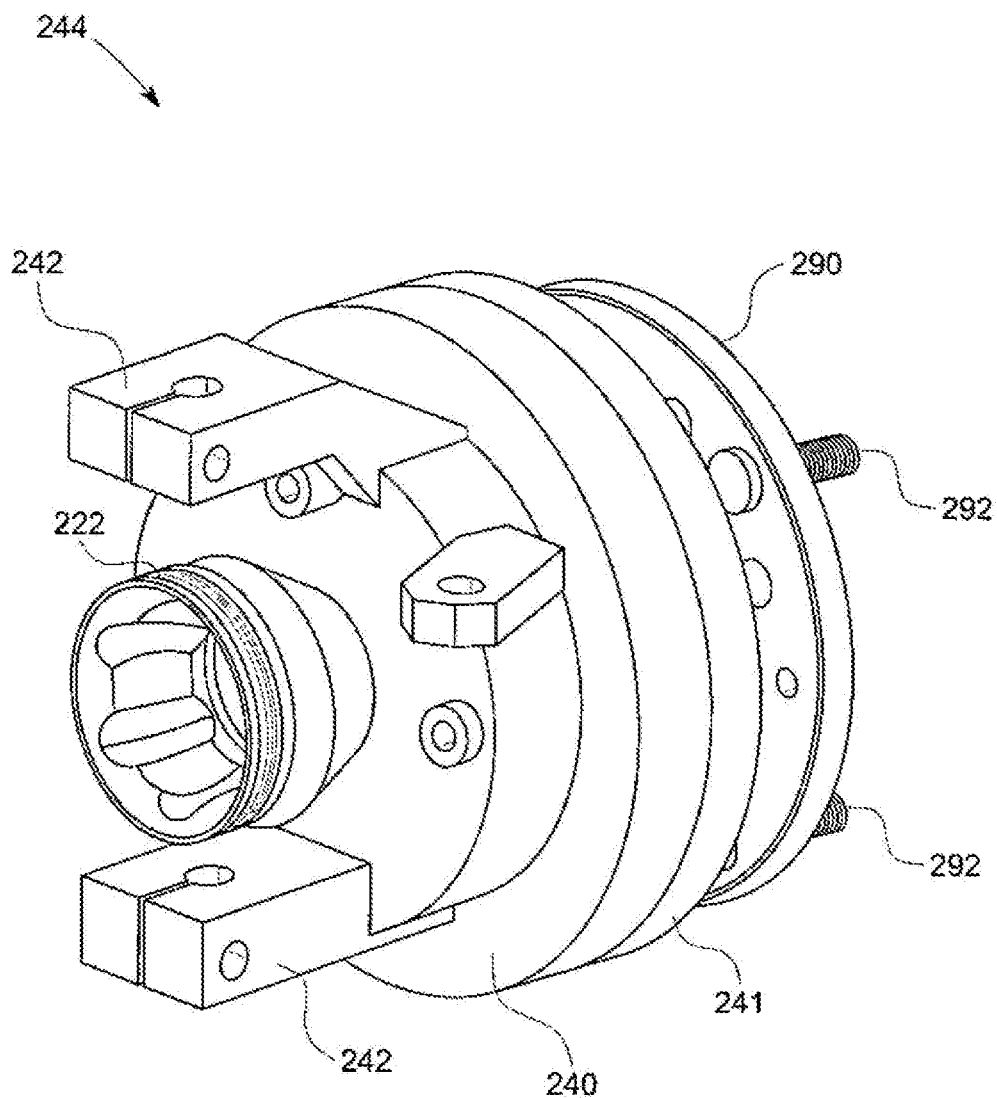
FIG. 11 is a rear perspective view of the brake system illustrated in FIG. 10.

The cam plate 45 may be disposed for axial movement with respect to the spindle 38 between the brake release position and the braking position, as indicated by the axial arrow 51 in FIG. 8, responsive to partial rotation of the cam plate 45 with respect to the spindle 38, as indicated by the rotational arrow 49 in FIGS. 6 and 8. Any device or mechanism which translates the partial rotational motion into the axial motion of the cam plate 45 may be used for the purpose. Accordingly, in some embodiments, multiple ball bearing cavities 46 may extend into an outer surface of the cam plate 45. As illustrated in FIGS. 8 and 9, a sloped seat bevel 53 may extend from each ball bearing cavity 46 to the outer surface of the cam plate 45 in a direction which is opposite the direction of rotation 49 of the cam plate 45 with respect to the spindle 38. As illustrated in FIGS. 4, 6, 8 and 9, a ball bearing 48 may be seated in each ball bearing cavity 46. As illustrated in FIG. 8, each ball bearing 48 may engage the interior surface of the housing cover 14 of the portal box housing 2. Therefore, upon partial rotation of the cam plate 45 in the direction of the rotational arrow 49 in FIGS. 6 and 8, each ball bearing 48 may roll from its corresponding ball bearing cavity 46 onto the seat bevel 53, thereby pushing or shifting the cam plate 45 in the axial direction 51 (FIG. 8) from the brake release position toward and against the adjacent outer clamp plate 62 to the braking position. This action may drive the outer clamp plate 62, first inner clamp plate 58 and second inner clamp plate 59 on the spindle 38 toward the pressure plate 64, compressing the first outer friction disk 54 between the outer clamp plate 62 and the first inner clamp plate 58, the second outer friction disk 60 between the second inner clamp plate 59 and the pressure plate 64 and the inner friction disk 50 between the first inner clamp plate 58 and the second inner clamp plate 59, terminating rotation of the first outer friction disk 54, the second outer friction disk 60 and the inner friction disk 60. Consequently, the first outer friction disk 54, the second outer friction disk 60 and the inner friction disk 50, splined to the spindle 38, may terminate rotation of the spindle 38 and thus apply braking force to the front wheels 101 and the rear wheels 102 of the vehicle 100.

As further illustrated in FIGS. 4 and 6, in some embodiments, at least one spring guide pin 70, typically secured by a pin bolt 72, may span the outer clamp plate 62 and the pressure plate 64. A brake release spring 71 may be deployed in place on each spring guide pin 70. Accordingly, in the brake release position of the cam plate 45, the brake release spring 71 may bias the outer clamp plate 62, the first inner clamp plate 58 and the second inner clamp plate 59 in the brake release position such that the first outer friction disk 54, the second outer friction disk 60 and the inner friction disk 50 rotate with the spindle 38.

As illustrated in FIGS. 4-6, a brake actuator 73 may operably engage the wet brake system 44 to actuate the wet brake system 44 between the brake release position and the braking position by rotation of the cam plate 45. The brake actuator 73 may have any design which is suitable for the purpose. In some embodiments, the brake actuator 73 may include a fluid-actuated brake cylinder 74. A brake piston 75 may extend from the brake cylinder 74. The brake piston 75 may operably engage the cam plate 45 of the wet brake system 44 according to the knowledge of those skilled in the art to facilitate rotation of the cam plate 45 between the brake release position and the braking position. As illustrated in FIG. 6, in some embodiments, a brake pivot cavity 47 may be provided in an outer surface or flange of the cam plate 45. A brake pivot lever 84 may engage the brake pivot cavity 47. A push rod 81 may extend from the brake piston 75. The push rod 81 may engage the brake pivot lever 84. Accordingly, upon extension of the brake piston 75 from the brake cylinder 74, the push rod 81 may pivot the brake pivot lever 84 which may, in turn, rotate the cam plate 45 from the brake release position to the braking position. Upon subsequent retraction of the brake piston 75 back into the brake cylinder 74, the push rod 81 may pivot the brake pivot lever 84 such that the brake pivot lever 84 returns the cam plate 45 from the braking position back to the brake release position as the brake release spring 71 on each spring guide pin 70 typically returns the outer clamp plate 62, first inner clamp plate 58 and second inner clamp plate 59 of the wet brake system 44 back to the brake release position.

In some embodiments, the brake cylinder 74 may be mounted on the exterior of the portal box housing 2 using a bolt 82 (FIG. 4) and/or other brackets, clips, clamps fasteners and/or other suitable attachment mechanism known by those skilled in the art. The push rod 81 may extend through a push rod seal 77 seated in a push rod opening (not illustrated) typically in the side housing wall 10 of the portal box housing 2. The brake piston 75 may extend through a brake piston wiper seal 78, typically sealed with a brake piston O-ring 79, to wipe the brake cooling fluid 56 (FIG. 7) from the brake piston 75 as it retracts back into the brake cylinder 74. In other embodiments, the brake cylinder 74 may be mounted on a structural component of the vehicle 100 according to the knowledge of those skilled in the art.

The user-actuated brake handles, foot pedals and/or other brake controls (not illustrated) on the vehicle 100 may be connected to the brake cylinder 74 of the brake actuator 73 according to the knowledge of those skilled in the art to facilitate manual actuation of the brake actuator 73 and deployment of the wet brake system 44 from the brake release position to the braking position. In some embodiments, the brake actuator 73 may include a brake piston spring 76 which may return the brake piston 75 from the braking position to the brake release position upon release of the brake actuator 73.

Referring next to FIGS. 1-7 of the drawings, in typical application, the lift kit and gear reduction system 26 and the wet brake system 44 may be assembled in the housing interior 18 of the portal box housing 2. The housing cover 14 may be attached to the side housing wall 10 of the portal box housing 2 typically using the cover fasteners 15 with washers 16, as illustrated in FIG. 4. As illustrated in FIG. 7, the spindle 38 may extend from the housing interior 18 through an output seal 95 seated in a spindle opening 12 in the housing cover 14.

An axle nut 96 may be threaded on the CV shaft 114 in the housing interior 18. A housing cap 86 may be secured on the housing cover 14 over the axle nut 96, typically using cap bolts 94 (FIG. 4). A cap gasket 87 may be sandwiched between the housing cap 86 and the housing cover 14. The brake cooling fluid 56 (FIG. 7) may be placed in the housing interior 18 typically by removing the plug 8 from the fluid opening 7 (FIG. 4), pouring the brake cooling fluid 56 through the fluid opening 7 into the housing interior 18 and replacing the plug 8 in the fluid opening 7.

The portal box housing 2 of each portal box assembly 1 may be attached to the vehicle 100 at each of the front wheels 101 and the rear wheels 102, typically as was heretofore described with respect to FIGS. 2 and 3. The user-actuated brake controls (not illustrated) on the vehicle 100 may be connected to the brake actuator 73 of each portal box assembly 1 according to the knowledge of those skilled in the art. As illustrated in FIGS. 4 and 5, a wheel hub 90 may be splined to the exterior protruding segment of the spindle 38 and typically secured with a castle nut 91, which may be secured with cotter pins 93. Wheel studs 92 may be extended through stud openings (not illustrated) in the wheel hub 90 to mount each corresponding front wheel 101 or rear wheel 102 to the wheel hub 90 typically in the conventional manner.

It will be appreciated by those skilled in the art that the lift kit and gear reduction system 26 in the housing interior 18 lifts the chassis of the vehicle 100 with respect to the front wheels 101 and rear wheels 102 of the vehicle 100. The lift kit and gear reduction system 26 transmits engine torque from each front drive axle 103 (FIG. 2) or rear drive axle 104 (FIG. 3) to the spindle 38 and wheel hub 90 to drive the corresponding front wheel 101 or rear wheel 102. The lift kit and gear reduction system 26 may additionally increase the wheel torque of the front wheels 101 and rear wheels 102, depending typically on the gear ratios between the input gear 27 and the output gear 34.

The wet brake system 44 of the portal box assembly 1 may facilitate independent braking at each of the front wheels 101 and the rear wheels 102 of the vehicle 100 as the operator operates the vehicle 100. As the operator applies the brakes to the portal box assemblies 1, the brake actuator 73 may actuate the wet brake system 44 typically as was heretofore described. The brake cooling fluid 56 in the housing interior 18 may absorb the thermal energy which is generated by the outer clamp plate 62, first inner clamp plate 58 and second inner clamp plate 59 against the inner friction disk 50, first outer friction disk 54 and second outer friction disk 60. In some embodiments, the housing cover 14 may be detached from the side housing wall 10 of the portal box housing 2 to facilitate replacement and/or maintenance of the lift kit and gear reduction system 26, wet brake system 44 and/or other components in the housing interior 18.

Figure 12:
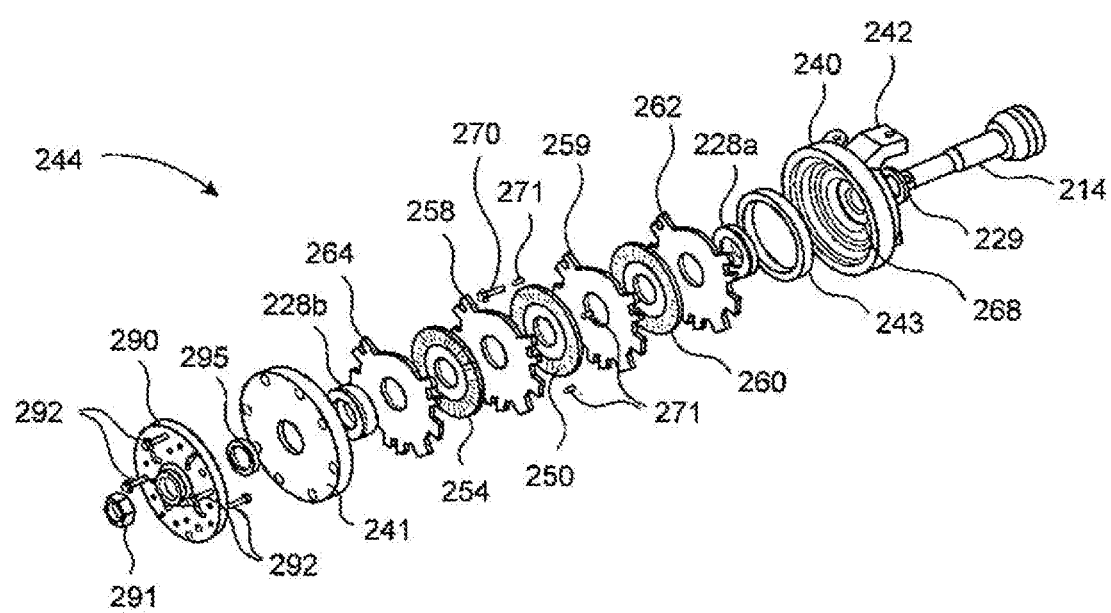
FIG. 12 is an exploded front perspective view of the brake system illustrated in FIG. 10.
Figure 13:
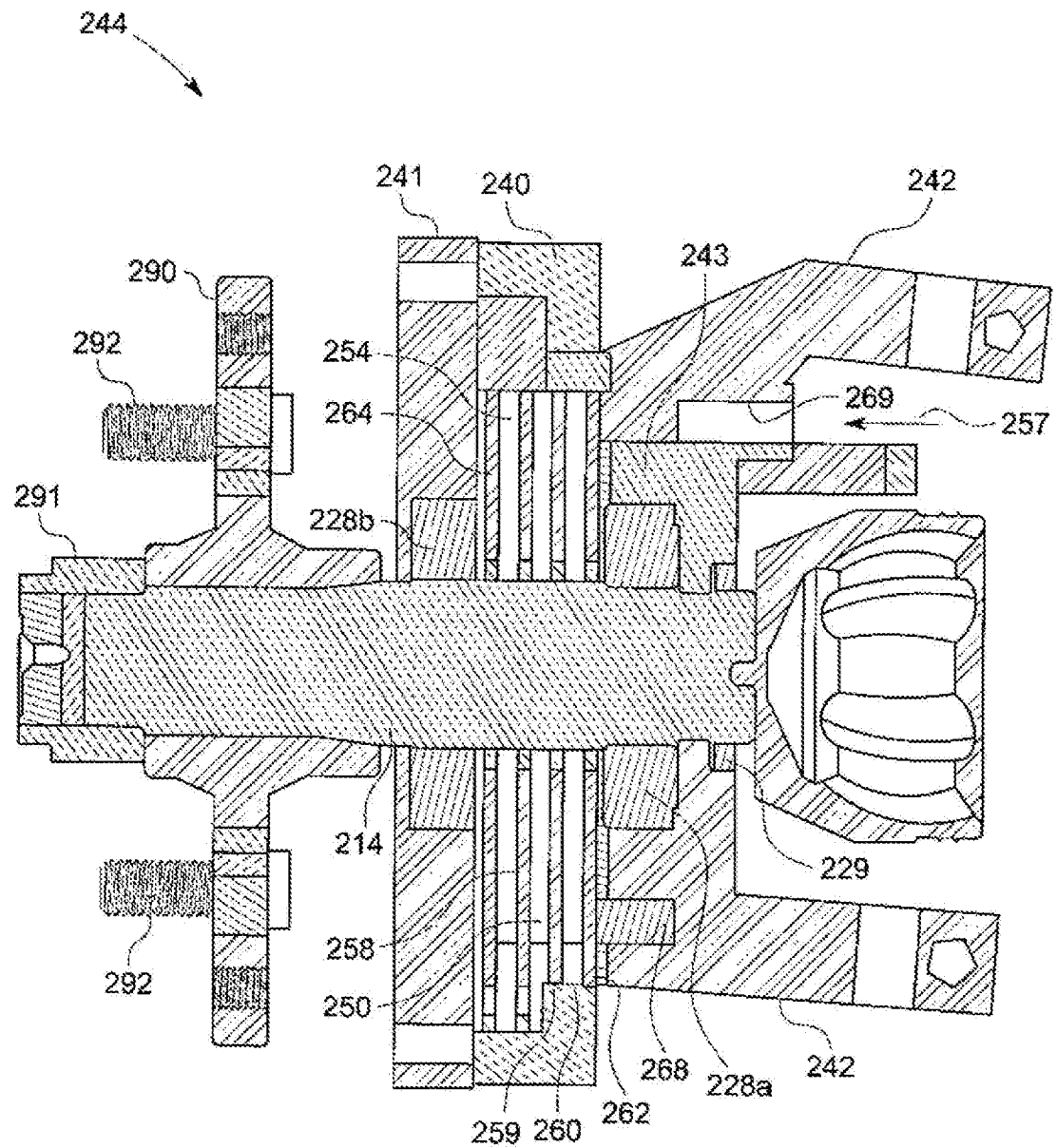
FIG. 13 is a longitudinal sectional view of the brake system illustrated in FIG. 10.

Referring next to FIGS. 10-13 of the drawings, an illustrative embodiment of a wet brake system suitable for application on a vehicle 100 (FIG. 1) is generally indicated by reference numeral 244. In the wet brake system 244, elements which are analogous to the respective elements of the brake mechanism 44 that was heretofore described with respect to the portal box assembly 1 in FIGS. 4-7 are designated by the same respective numerals in the 244-295 series in FIGS. 10-13. The wet brake system 244 may include a brake housing 240. A brake housing cover 241 may be attached to the brake housing 240 typically using housing fasteners (not illustrated) suitable for the purpose. At least one housing mount flange 242 may be provided on the brake housing 240. The housing mount flange 242 may facilitate mounting of the brake housing 240 on the vehicle 100 according to the knowledge of those skilled in the art. For example and without limitation, in some applications, the housing mount flange 242 may be attached to the housing mount plate 107 (FIGS. 2 and 3) using suitable fasteners (not illustrated) suitable for the purpose. As illustrated in FIGS. 12 and 13, the CV shaft 214 of the ATV 100 may extend through a first input bearing 228a in a central shaft opening (not numbered) in the brake housing 240 and through a second input bearing 228b in a central shaft opening (not numbered) in the brake housing cover 241.

As illustrated in FIGS. 12 and 13, an annular piston bore 268 may be provided in the brake housing 240. A piston 243, which may be a ring piston in some embodiments, may be slidably disposed in the piston bore 268 in concentric relationship to the CV shaft 214. As illustrated in FIG. 13, a brake fluid port 269 may communicate with the piston bore 268 for purposes which will be hereinafter described. The piston 243 may be positional between a brake release position and a braking position within the piston bore 268 responsive to pressurization of brake fluid 257 (FIG. 13) through the brake fluid port 269 against the piston 243. The user-actuated brake handles, foot pedals and/or other brake controls (not illustrated) on the vehicle 100 may be connected to the brake fluid port 269 in the brake housing 240 to facilitate pressurization of the brake fluid 257 according to the knowledge of those skilled in the art A pressure plate 264 may be immovably mounted in the brake housing 240 in fixed relationship with respect to the CV shaft 214 and in spaced-apart relationship to the piston 243. An outer clamp plate 262 may be provided on the CV shaft 214 adjacent to the piston 243. A first inner clamp plate 258 and a second inner clamp plate 259 may be provided on the CV shaft 214 between the outer clamp plate 262 and the pressure plate 264. The first inner clamp plate 258, the second inner clamp plate 259 and the outer clamp plate 262 may each be disposed for axial movement with respect to the CV shaft 214.

A first outer friction disk 254 may be splined to the CV shaft 214 between the pressure plate 264 and the first inner clamp plate 258. A second outer friction disk 260 may be splined to the CV shaft 214 between the outer clamp plate 262 and the second inner clamp plate 259. An inner friction disk 250 may be splined to the CV shaft 214 between the first inner clamp plate 258 and the second inner clamp plate 259 such that the first outer friction disk 254, the second outer friction disk 260 and the inner friction disk 250 rotate with the CV shaft 214.

As further illustrated in FIG. 12, in some embodiments, at least one spring guide pin 270, typically secured by a pin bolt (not illustrated), may span the outer clamp plate 262 and the pressure plate 264. A brake release spring 271 may be deployed in place on each spring guide pin 270. Accordingly, in the brake release position of the piston 243, the brake release spring 271 may bias the outer clamp plate 262, the first inner clamp plate 258 and the second inner clamp plate 259 in the brake release position such that the first outer friction disk 254, the second outer friction disk 260 and the inner friction disk 250 rotate with the CV shaft 214.

In typical application of the wet brake system 244, a brake housing 240 may be attached to the vehicle 100 (FIG. 1) at each of the front wheels 101 and the rear wheels 102 typically using suitable fasteners according to the knowledge of those skilled in the art. In some applications, the wet brake system 244 may be a stand-alone unit without a lift kit and gear reduction system 26 (FIG. 4). In other applications, the wet brake system 244 may be included as part of the portal box assembly 1 which was heretofore described with respect to FIGS. 4-7, in which case the brake housing 240 would correspond to the portal box housing 2 and the portal box housing 2 would contain the wet brake system 244 as well as the lift kit and gear reduction system 26.

The brake cooling fluid (not illustrated) may be placed in the brake housing 240 typically by pouring the brake cooling fluid through a fluid opening (not illustrated) into the brake housing 240. The user-actuated brake controls (not illustrated) on the vehicle 100 may be connected to the brake fluid port 269 which communicates with the piston bore 268 (FIG. 13) according to the knowledge of those skilled in the art. As illustrated in FIG. 12, a wheel hub 290 may be splined to the exterior protruding segment of the CV shaft 214 and typically secured with a castle nut 291. Wheel studs 292 may be extended through stud openings (not illustrated) in the wheel hub 290 to mount each corresponding front wheel 101 or rear wheel 102 to the wheel hub 290 typically in the conventional manner.

The wet brake system 244 may facilitate independent braking at each of the front wheels 101 and the rear wheels 102 of the vehicle 100 as the operator operates the vehicle 100. In the brake release configuration of the wet brake system 244, the first outer friction disk 254, the second outer friction disk 260 and the inner friction disk 250 may rotate with the CV shaft 214. As the operator applies the brakes to the wet brake system 244, the brake fluid 257 may apply braking pressure to the outer clamp plate 262. The outer clamp plate 262 may move toward the stationary pressure plate 264, thereby compressing the inner friction disk 250, the first outer friction disk 254 and the second outer friction disk 260 between the first inner clamp plate 258, the second inner clamp plate 259, the outer clamp plate 262 and the pressure plate 264, preventing further rotation of the inner friction disk 250, the first outer friction disk 254 and the second outer friction disk 260 and applying a braking force to the CV shaft 214. The brake cooling fluid in the brake housing 240 may absorb the thermal energy which is generated by the outer clamp plate 262, first inner clamp plate 258 and second inner clamp plate 259 against the inner friction disk 250, first outer friction disk 254 and second outer friction disk 260. In some embodiments, the brake housing cover 241 may be detached from the brake housing 240 to facilitate replacement and/or maintenance of the components of the wet brake system 244 in the brake housing 240.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A portal box assembly for mounting a wheel of a vehicle having a drive axle, comprising:
   a portal box housing configured for mounting on the vehicle, the portal box housing having a housing interior;
   a lift kit and gear reduction system in the housing interior of the portal box housing, the lift kit and gear reduction system including:
      an input gear configured to be drivingly engaged by the drive axle on the vehicle;
      an output gear drivingly engaged by the input gear, the output gear disposed in offset or spaced-apart relationship to the input gear; and
      a spindle drivingly engaged by the output gear, the spindle configured to drivingly engage the wheel of the vehicle; and
   a wet brake system in the housing interior of the portal box housing, the wet brake system deployable between a brake release configuration and a braking configuration applying a braking force to the spindle.

2. The portal box assembly of claim 1 further comprising a portal box mount bracket configured for mounting on the vehicle, and wherein the portal box housing is carried by the portal box mount bracket.

3. The portal box assembly of claim 2 wherein the portal box mount bracket comprises a housing mount plate and a bracket arm and a bracket flange extending from the housing mount plate, and the portal box housing is carried by the housing mount plate.

4. The portal box assembly of claim 1 wherein the lift kit and gear reduction system comprises an idler gear drivingly engaged by the input gear and drivingly engaging the output gear.

5. The portal box assembly of claim 1 wherein the portal box housing comprises a rear housing wall, a side housing wall extending from the rear housing wall and a housing cover carried by the side housing wall.

6. The portal box assembly of claim 5 wherein the housing cover is detachably carried by the side housing wall.

7. The portal box assembly of claim 1 wherein the wet brake system comprises a rotatable cam plate disposed for axial movement with respect to the spindle, a pressure plate carried by the portal box housing in fixed relationship to the spindle and in spaced-apart relationship to the cam plate, at least one clamp plate disposed for axial movement with respect to the spindle between the cam plate and the pressure plate and at least one friction disk splined to the spindle between the at least one clamp plate and the pressure plate; and a brake actuator engaging the wet brake system, the brake actuator configured to actuate the wet brake system between the brake release configuration and the braking configuration by rotation of the cam plate.

8. The portal box assembly of claim 7 wherein the brake actuator comprises a fluid-actuated brake cylinder and a brake piston extendable from the brake cylinder, the brake piston engaging the cam plate.

9. A portal box assembly for mounting a wheel of a vehicle having a drive axle, comprising:
   a portal box housing configured for mounting on the vehicle, the portal box housing having a housing interior;

a lift kit and gear reduction system in the housing interior of the portal box housing, the lift kit and gear reduction system including:
  an input gear configured to be drivingly engaged by the drive axle on the vehicle;
  an output gear drivingly engaged by the input gear, the output gear disposed in offset or spaced-apart relationship to the input gear; and
  a spindle drivingly engaged by the output gear, the spindle configured to drivingly engage the wheel of the vehicle; and
a wet brake system in the housing interior of the portal box housing, the wet brake system deployable between a brake release configuration and a braking configuration applying a braking force to the spindle, the wet brake system including:
  a rotatable cam plate disposed for axial movement with respect to the spindle;
  a pressure plate carried by the portal box housing in fixed relationship to the spindle and in spaced-apart relationship to the cam plate;
  at least one clamp plate disposed for axial movement with respect to the spindle between the cam plate and the pressure plate;
  at least one friction disk splined to the spindle between the at least one clamp plate and the pressure plate;
  at least one spring guide pin spanning the at least one clamp plate and the pressure plate; and
  a brake release spring on the at least one spring guide pin, the brake release spring normally biasing the at least one clamp plate in the brake release configuration; and
a brake actuator engaging the cam plate of the wet brake system, the brake actuator configured to actuate the wet brake system between the brake release configuration and the braking configuration by rotation of the cam plate.

10. The portal box assembly of claim 9 further comprising a portal box mount bracket configured for mounting on the vehicle, and wherein the portal box housing is carried by the portal box mount bracket.

11. The portal box assembly of claim 10 wherein the portal box mount bracket comprises a housing mount plate and a bracket arm and a bracket flange extending from the housing mount plate, and the portal box housing is carried by the housing mount plate.

12. The portal box assembly of claim 9 wherein the lift kit and gear reduction system comprises an idler gear drivingly engaged by the input gear and drivingly engaging the output gear.

13. The portal box assembly of claim 9 wherein the portal box housing comprises a rear housing wall, a side housing wall extending from the rear housing wall and a housing cover carried by the side housing wall.

14. The portal box assembly of claim 13 wherein the housing cover is detachably carried by the side housing wall.

15. The portal box assembly of claim 13 further comprising a plurality of ball bearing openings in the cam plate, the plurality of ball bearings having a plurality of seat bevels, respectively, and a plurality of ball bearings in the plurality of ball bearing openings, respectively, the plurality of ball bearings engaging the housing cover of the portal box housing.

16. The portal box assembly of claim 9 wherein the brake actuator comprises a fluid-actuated cylinder and a brake piston extendable from the fluid-actuated brake cylinder, the brake piston engaging the cam plate.

17. A portal box assembly for mounting a wheel of a vehicle having a drive axle, comprising:
  a portal box housing configured for mounting on the vehicle, the portal box housing including:
    a rear housing wall;
    a side housing wall extending from the rear housing wall;
    a housing cover on the side housing wall in offset or spaced-apart relationship to the rear housing wall; and
    a housing interior;
  a lift kit and gear reduction system in the housing interior of the portal box housing, the lift kit and gear reduction system including:
    an input gear configured to be drivingly engaged by the drive axle on the vehicle;
    an output gear drivingly engaged by the input gear, the output gear disposed in offset or spaced-apart relationship to the input gear; and
    a spindle drivingly engaged by the output gear, the spindle configured to drivingly engage the wheel of the vehicle; and
  a wet brake system in the housing interior of the portal box housing, the wet brake system deployable between a brake release configuration and a braking configuration applying a braking force to the spindle, the wet brake system including:
    a rotatable cam plate disposed for axial movement with respect to the spindle;
    a plurality of ball bearing openings in the cam plate, the plurality of ball bearings having a plurality of seat bevels, respectively;
    a plurality of ball bearings in the plurality of ball bearing openings, respectively, the plurality of ball bearings engaging the housing cover of the portal box housing;
    a pressure plate carried by the portal box housing in fixed relationship to the spindle and in spaced-apart relationship to the cam plate;
    an outer clamp plate adjacent to the cam plate, the outer clamp plate disposed for axial movement with respect to the spindle;
    first and second inner clamp plates between the outer clamp plate and the pressure plate, the first and second inner clamp plates disposed for axial movement with respect to the spindle;
    a first outer friction disk splined to the spindle between the outer clamp plate and the first inner clamp plate;
    a second friction disk splined to the spindle between the first inner clamp plate and the second inner clamp plate;
    a third friction disk splined to the spindle between the second inner clamp plate and the pressure plate;
    at least one spring guide pin spanning the outer clamp plate and the pressure plate; and
    a brake release spring on the at least one spring guide pin, the brake release spring normally biasing the outer clamp plate and the first and second inner clamp plates in the brake release configuration;
  a brake actuator engaging the cam plate of the wet brake system, the brake actuator configured to actuate the wet brake system between the brake release configuration and the braking configuration by rotation of the cam plate, whereby the plurality of ball bearings are displaced from the plurality of ball bearing openings, respectively, to the plurality of seat bevels, respectively, and apply the cam plate against the outer clamp plate against bias imparted by the brake release spring on the at least one spring guide pin; and brake cooling fluid in the housing interior of the portal box housing.

18. The portal box assembly of claim 17 further comprising a portal box mount bracket configured for mounting on the vehicle, and wherein the portal box housing is carried by the portal box mount bracket.

19. The portal box assembly of claim 18 wherein the portal box mount bracket comprises a housing mount plate and a bracket arm and a bracket flange extending from the housing mount plate, and the portal box housing is carried by the housing mount plate.

20. The portal box assembly of claim 17 wherein the brake actuator comprises a fluid-actuated cylinder and a brake piston extendable from the fluid-actuated brake cylinder.

21. A wet brake system for mounting a wheel of a vehicle having a drive axle, comprising:

a brake housing configured for mounting on the vehicle;

a wet brake system in the brake housing, the wet brake system deployable between a brake release configuration and a braking configuration and configured to apply a braking force to the drive axle and including:

a piston slidably disposed in the brake housing between a brake release position and a braking position;

a pressure plate carried by the brake housing in fixed and spaced-apart relationship to the piston;

at least one clamp plate disposed for axial movement between the piston and the pressure plate; and at least one friction disk configured to be splined to the drive axle between the at least one clamp plate and the pressure plate.

* * * * *